(12) United States Patent
Hepper et al.

(10) Patent No.: US 7,117,364 B1
(45) Date of Patent: Oct. 3, 2006

(54) SYSTEM AND METHOD FOR DOWNLOADING APPLICATION COMPONENTS TO A CHIPCARD

(75) Inventors: Stefan Hepper, Tuebingen (DE); Thomas Schaeck, Achern (DE)

(73) Assignee: International Busienss Machines Corporation, Armonk, NY (US)

( * ) Notice: Subject to any disclaimer, the term of this patent is extended or adjusted under 35 U.S.C. 154(b) by 1009 days.

(21) Appl. No.: 09/679,333

(22) Filed: Oct. 4, 2000

(30) Foreign Application Priority Data

Oct. 5, 1999 (DE) ................................ 199 47 986

(51) Int. Cl.
*H04L 9/00* (2006.01)
(52) U.S. Cl. ...................... 713/176; 713/168; 713/171; 713/172
(58) Field of Classification Search ................. 713/176
See application file for complete search history.

(56) References Cited

U.S. PATENT DOCUMENTS

| | | | | |
|---|---|---|---|---|
| 5,729,594 | A * | 3/1998 | Klingman | 379/93.12 |
| 5,923,884 | A * | 7/1999 | Peyret et al. | 717/167 |
| 5,974,529 | A * | 10/1999 | Zumkehr et al. | 712/41 |
| 6,360,364 | B1 * | 3/2002 | Chen et al. | 711/169 |
| 6,575,372 | B1 * | 6/2003 | Everett et al. | 235/492 |

FOREIGN PATENT DOCUMENTS

GB 2314948 A * 1/1998

OTHER PUBLICATIONS

Bruce Schneier, Applied Cryptography, 1996, John Wiley & Sons, Inc., pp. 366-367.*

* cited by examiner

*Primary Examiner*—Gilberto Barron
*Assistant Examiner*—Benjamin E. Lanier
(74) *Attorney, Agent, or Firm*—Lily Neff, Esq.; Kevin P. Radigan, Esq.; Heslin Rothenberg Farley & Mesiti, P.C.

(57) ABSTRACT

The present invention describes a method for downloading application components, so-called on-card application components, from a server via a client to a chipcard, wherein the server and the client communicate with each other via a distributed system, in particular an Intranet or the Internet. The advantages of the present invention lie in the fact that downloading of the application components is divided into two stages: The first stage occurs on the server only, and ensures that not every command to download the application component is sent individually over the network. This is effected by means of a broadband-optimized protocol which bundles the individual commands to download the application component into a command sequence and sends it as a complete data packet over the network. This reduces the time required for downloading application components over the network. Each command within the command sequence is assigned a digital signature and, where appropriate, encrypted. This ensures that only authenticated commands are accepted by the chipcard. In this way this invention meets security requirements for the transfer of data via distributed systems, in particular over the Internet. The second stage occurs between the client and the chipcard, and ensures that the data packets are unpacked and sent individually to the chipcard. All security-relevant keys and certificates are stored on the secure server. Communication between the client and the server runs preferentially via SSL (Secure Sockets Layer) as the transfer protocol. Misuse of the inventive system/method is thereby rendered much more difficult.

17 Claims, 4 Drawing Sheets

SYSTEM AND METHOD FOR DOWNLOADING APPLICATION COMPONENTS TO A CHIPCARD

TECHNICAL FIELD

The present invention describes a system and method for downloading application components via distributed systems to chipcards, in particular to chipcards which are already in use.

BACKGROUND OF THE INVENTION

Normally chipcards are shipped with prepared on-card application components.

These on-card application components permit communication between the chipcard and the chipcard applications, the so-called off-card applications, which are installed on a terminal, e.g. a server system. The chipcard—i.e. the on-card application component—communicates via a chipcard reader with this off-card application. Modern chipcards, so-called multifunction chipcards such as Java Cards or Smart Cards for Windows, have additional functionality permitting on-card application components to be mounted on the chipcard retrospectively, i.e. after the chipcard has been shipped (see FIG. 1). In such cases the on-card application components are downloaded from the terminal to the chipcard via the chipcard reader.

VISA, for example, has defined an Open Platform Specification describing the commands between the off-card application and the on-card application component, the on-card interface and the security standards. OCF (Open Card Framework) and Microsoft's PC/SC on the other side address the communication between the application, the chipcard reader and the chipcard.

The more widespread use of distributed systems has resulted in an increasing need for downloading of on-card application components to the chipcard via distributed systems. The risks of such methods are obvious. The network is subject to varying loads, so the download may take a long time depending on capacity. Another key aspect in this context is security. All data transfers from the server via the client to the chipcard must be safeguarded. It must be ensured that a simple, secure authentication and encryption method which responds to the varying loads on the network is used when downloading application components.

At present, however, no systems or methods are believed to address this possibility.

SUMMARY OF THE INVENTION

It is therefore the object of the present invention to deliver a system and method for downloading application components via distributed systems to a chipcard in a simple manner, taking account of the necessary security checks.

This object is fulfilled by the characteristics of claims 1, 17, 18 and 20. Advantageous embodiments of the present invention are presented in the sub-claims.

The advantages of the present invention lie in the fact that downloading of the application components is divided into two stages.

The first stage occurs on the server only, and ensures that not every command to download the application components is sent individually over the network. This is effected by means of an optimized protocol which bundles the individual commands to download the application component into a command sequence and sends it as a data packet over the network. This reduces the time required for downloading application components over the network. Each command within the command sequence is assigned a digital signature and, where appropriate, encrypted. This ensures that only authenticated commands are accepted by the chipcard.

In this way this invention meets security requirements for the transfer of data via distributed systems, in particular the Internet.

The second stage occurs between the client and the chipcard, and ensures that the data packets are unpacked and sent individually to the chipcard.

All security-relevant keys and certificates are stored on the secure server. Communication between the client and the server runs preferentially via SSL (Secure Sockets Layer) as the transfer protocol. Misuse of the inventive system/method is thereby rendered much more difficult.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
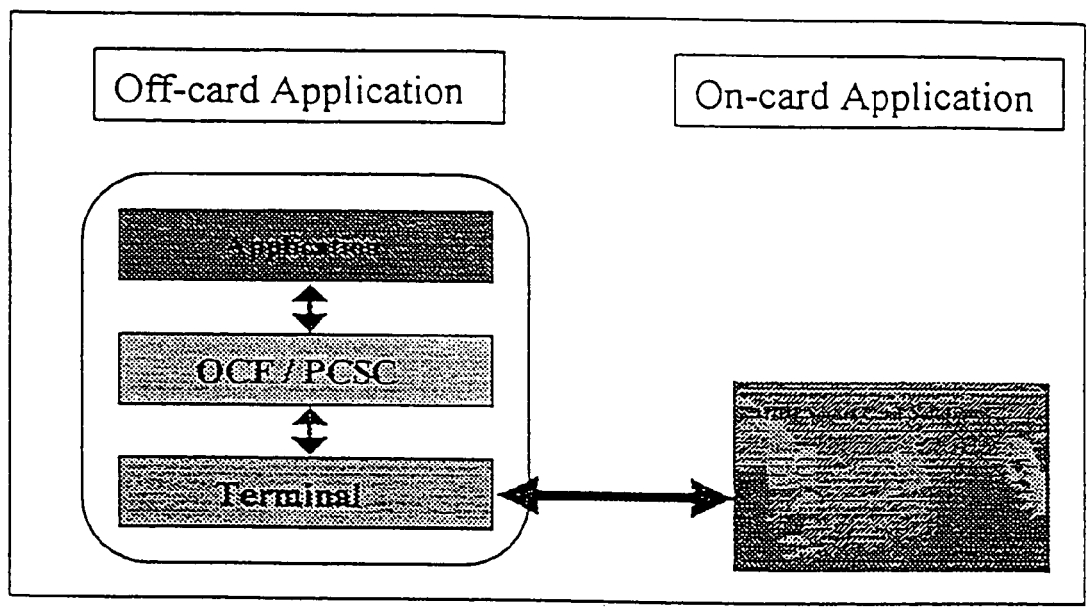
FIG. 1 shows the state of the art of communication between the off-card application and on-card application component.

FIG. 1 shows the state of the art in downloading of on-card application components from a terminal to the chipcard and in communication between the on-card application component and off-card application. In the state of the art the chipcard applications consist of an off-card application stored on a terminal and an on-card application component stored on the chipcard in the nonvolatile memory (see FIG. 1). The terminal consists of a data processing unit with a chipcard reader and the corresponding driver software for the chipcard reader. The on-card application component communicates with the off-card application over several layers. Layer 1 defines the physical transfer protocol. Layer 2 superimposes that protocol with a logical, byte-oriented protocol. Layer 3 maps higher programming language on layer 2. An example of layer 1 is the protocol T=0, T=1 (ISO/IEC7816-3), layer 2 APDU protocol (ISO/7816-4), layer 3 OCF (Open Card Framework) or PCSC ( ).

Normally the on-card application component is transferred to the chipcard via a loader application which runs on the terminal. In this process suitable chipcard commands are used (e.g. for file-oriented chipcards "CREATE" and "UPDATE" commands). At present no solution for the transfer of on-card application components via distributed systems to the chipcard is yet known.

Figure 2:
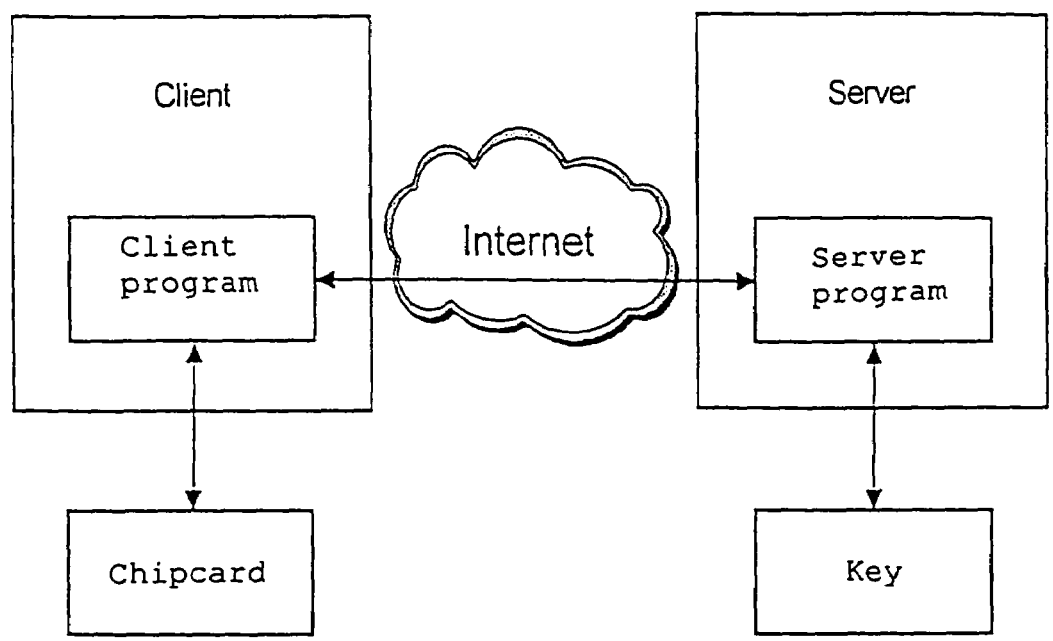
FIG. 2 shows a distributed communications architecture on which the present invention is based.

FIG. 2 shows the inventive architecture of the present invention. The inventive architecture is based on a client/server architecture. The client communicates with the server over a network, e.g. the Internet or an Intranet. The client is connected to a chipcard reader and only the server has access to the secret keys required to download on-card application components to the chipcard. The keys may either be stored on the server itself or on another system to which the server has access. The chipcard is protected against unauthorized downloading of on-card application components in such a way that it only accepts commands when they are signed and/or encrypted with the correct keys. On the client a runtime program must exist which communicates both with the chipcard and with the server and which implements a protocol dependent on the respective chipcard.

This protocol specifies when which messages must be exchanged with the chipcard and the server. On the server a runtime program must exist which communicates with the client and uses the keys accessible to the server as necessary, and which implements a protocol specifying when which messages must be exchanged with the client and when which keys must be used. The chipcards used are common chipcards (such as Java Cards or file-oriented chipcards) which do not have to be adapted for the present invention.

Figure 3:
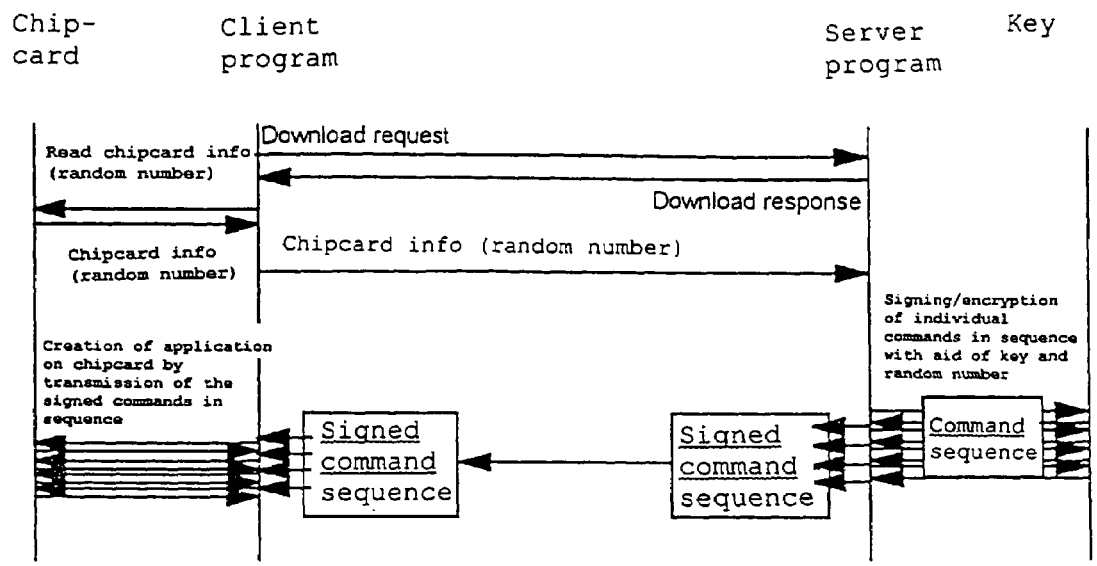
FIG. 3 shows the inventive steps involved in downloading on-card application components from a server over a network to a chipcard.

FIG. 3 shows the inventive steps for downloading of on-card application components from a server over a network to a chipcard.

The client establishes communication with the chipcard and with the server.

The client sends a request to the server for an on-card application component (application component A) to be placed on the chipcard. The client and server communicate preferentially via TCP/IP or HTTP.

The server sends a response to the client with the request to transmit the chipcard identification data and, where appropriate, a random number for authentication purposes. Chipcard identification data as a minimum contain data relating to the chipcard type and the chipcard number. The client receives the response from the server and sends appropriate command APPUs to the chipcard in order to retrieve the chipcard identification data and, where appropriate, a random number. The chipcard identification data are stored in the nonvolatile memory of the chipcard and can be read by means of suitable commands. The chipcard receives the commands and returns the chipcard identification data and, where appropriate, the random number to the client. The client sends these data in a request to the server.

The server receives the request and evaluates the chipcard identification data to find out which keys have to be used, or to derive the necessary keys from Master Keys, in order to be able to download the application component A. The keys are used to prepare a command sequence for downloading of the application A from the server to the chipcard. This command sequence causes the application A to be created on the chipcard. The command sequence is a predefined sequence stored in the nonvolatile memory area of the server for a specific application. A further embodiment of the invention is that the command sequence is created in whole or in part with the aid of a program on the server. This is preferentially applied where card-specific data are also to be integrated into the on-card application component by means of the command sequence. Preferentially each command within the sequence is signed with the aid of the key (Session Keys) and encrypted as necessary. This can be effected, for example, by assigning the first command within the sequence a MAC (message authentication code) with the aid of the random number and the correct key, and assigning all subsequent commands a MAC based on the MAC of the preceding command and the correct key. The sequence with the signed and, where appropriate, encrypted commands is sent to the client.

The client receives the response with the command sequence and sends the commands consecutively to the chipcard. The chipcard checks the signature and only executes the commands if the signature is correct.

Figure 4:
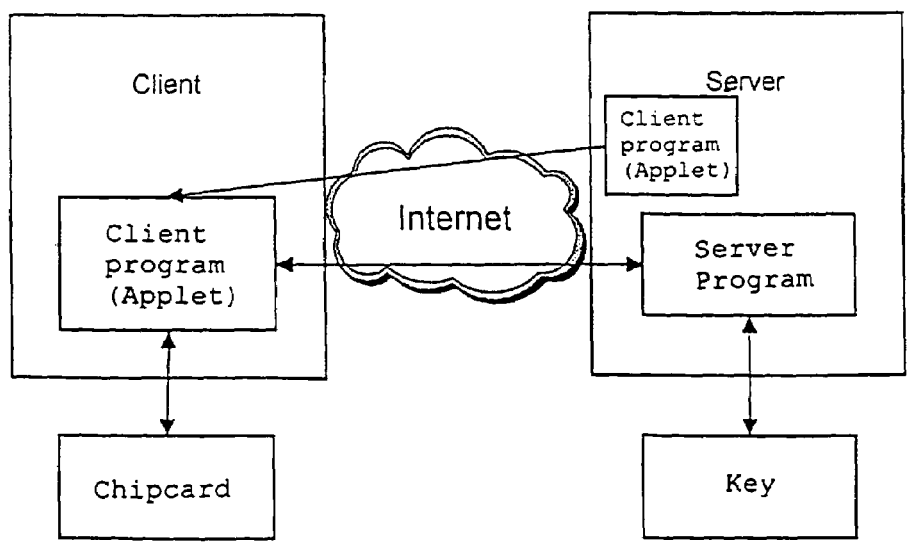
FIG. 4 shows the inventive architecture in accordance with FIG. 3 in a Java implementation.

FIG. 4 shows the inventive architecture in accordance with FIG. 3 in a Java implementation.

On the client a Web Browser is run to enable the user to navigate to the Web page of the server. The Web page of the server contains the applet which implements the client program described in FIG. 3. When the Web page is displayed the applet is downloaded from the server to the Browser. The applet establishes a communication link to a servlet on the server. The servlet has the functionality of the server program.

The procedure for downloading the on-card application component corresponds to that set out in FIG. 3.

Figure 5:
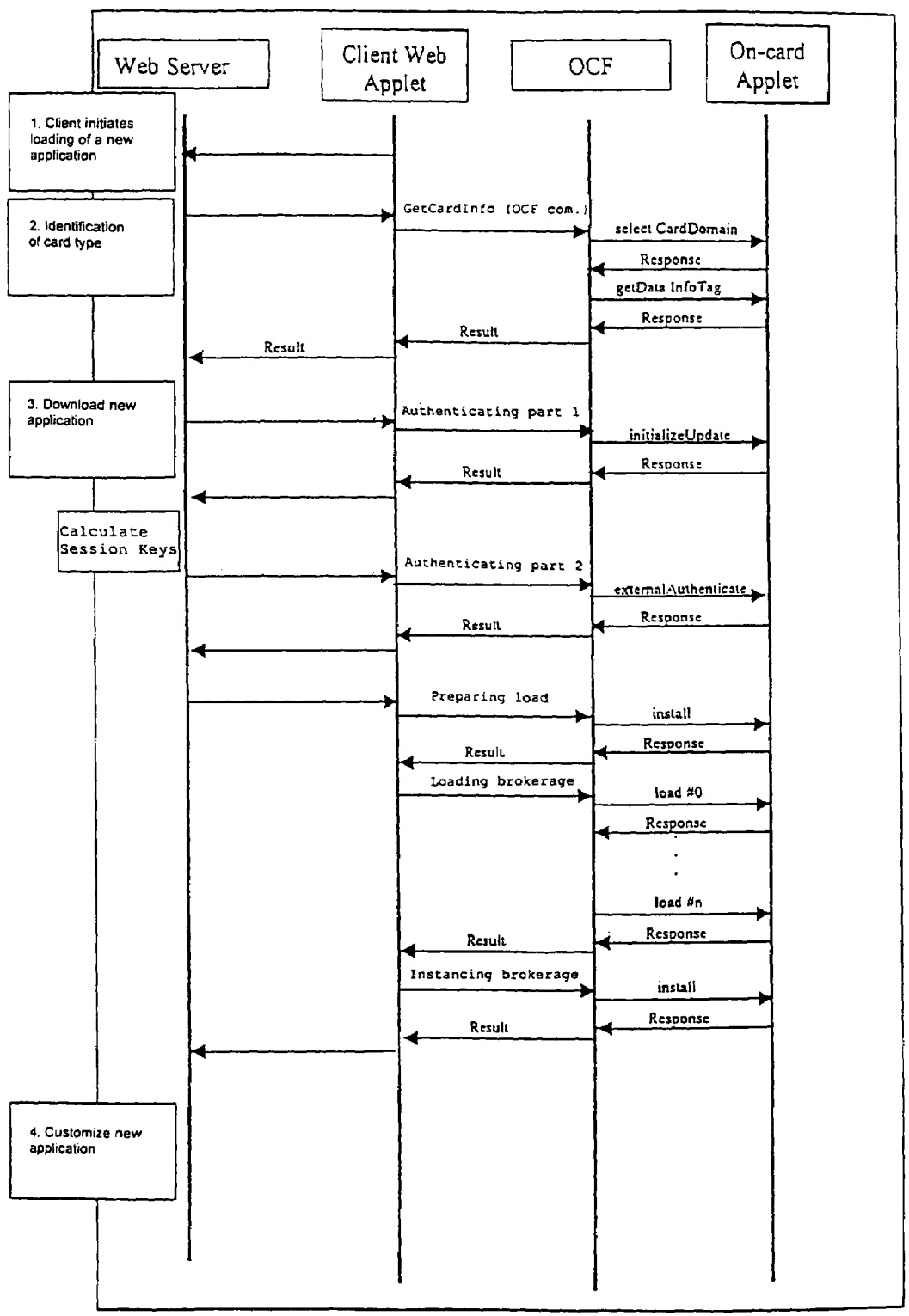
FIG. 5 shows the inventive steps involved in downloading on-card application components from a server over a network to a chipcard in a Java implementation.

FIG. 5 shows the inventive steps for downloading of on-card application components from a server over a network to a chipcard in a Java implementation.

It is assumed in this that a brokerage application stored on a server is to be loaded into the chipcard. Authentication keys are also stored on the server.

The client establishes communication with the chipcard and with the server. Communication with the chipcard is implemented by OCF (Open Card Framework).

The client sends a request to the server for the brokerage application (on-card application component) to be placed on the chipcard. The client and server communicate preferentially via TCP/IP or HTTP.

The server sends a response to the client with the request to transmit the chipcard identification data (GetCardInfo).

The client receives the response from the server and sends appropriate command APPUs to the chipcard in order to retrieve the chipcard identification data. The chipcard identification data are stored in the nonvolatile memory of the chipcard and can be read by means of suitable commands. The chipcard receives the commands and returns the chipcard identification data to the client. The client sends these data in a request to the server.

The server receives the request and evaluates the chipcard identification data to find out the card type. An authentication method is chosen depending on the card type. In the present implementation the card type is a VISA Open Platform card with symmetrical keys. The first authentication step involves the server generating a random number and selecting a key number, and then sending that information packed in a command to the client. The client extracts the OCF command and sends it to the OCF interface on the client computer. The OCF interface converts the OCF command into one or more APDUs and sends it/them to the chipcard. The chipcard receives the APDUs, identifies them as an authentication command, generates a random number, creates a Session Key from the two random numbers and the transmitted key, and thereby returns the random numbers in encrypted form.

The client transmits the card's response to the server. The server likewise generates a Session Key from the two random numbers and the key number. With the aid of this Session Key it checks the encrypted random numbers. If the check is successful the card is classed as authenticated.

The server sends a second authentication command to the client in order to authenticate itself according to the same method, as already described. If the check is successful the server is classed as authenticated.

The brokerage application is signed on the server by means of the Session Keys and encrypted as necessary in order to be able to download the broker application. This command sequence causes the application A to be created on the chipcard. The command sequence is a predefined sequence stored in the nonvolatile memory area of the server. A further embodiment of the invention is that the command sequence is created in whole or in part with the aid of a program on the server. This is preferentially applied where card-specific data are also to be integrated into the on-card application component by means of the command sequence.

Preferentially each command within the sequence is signed with the aid of the key (Session Keys) and encrypted as necessary. This can be effected, for example, by assigning the first command within the sequence a MAC (message authentication code) with the aid of the random number and the correct key and assigning all subsequent commands a MAC based on the MAC of the preceding command and the correct key. The sequence with the signed and, where appropriate, encrypted commands is sent to the client.

The client receives the response with the command sequence and sends the commands consecutively to the chipcard. The chipcard checks the signature and only executes the commands if the signature is correct.

The steps outlined can also be used to customize the new application/brokerage application.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. Method for downloading application components from a server via a client to a multifunction, processor-based smart card, wherein the server and the client are interconnected via a distributed system, said method comprising:

sending a request from the client to the server for a smart card application component for the processor-based smart card;

delivery of a secret key or Session Key by the server to the client, responsive to the request;

bundling in the server a sequence of commands to produce a bundled command sequence for downloading of the application component to the smart card;

generation of a digital signature in the server using the secret key or Session Key by way of each command within the bundled command sequence to produce a signed, bundled command sequence comprising a bundled sequence of individually signed commands;

transmission of the signed, bundled command sequence as a data packet to the client, thereby reducing data transfers between the server and the client;

unpacking of the data packet by the client and transmission of individual signed commands of the bundled command sequence in sequence to the smart card;

checking of the digital signature of the individual commands on the smart card and execution of the commands on the smart card if the digital signature is correct;

wherein the authentication method for generation of the Session Key is selected by:

transmission of a request from the server via the client to the smart card to transmit the smart card identification data stored on the smart card;

reading of the smart card identification data from the nonvolatile memory of the smart card and transmission of the smart card identification data via the client to the server;

identification from the smart card identification data of an authentication method by means of which a Session Key agreed between the server and the smart card can be generated;

wherein the Session Key is determined by an authentication method comprising:

generation of a first random number and selection of a secret key by the server;

transmission of the first random number via the client to the smart card;

generation of a second random number by the smart card;

creation of a Session Key from the first and second random numbers;

encrypting the first and second random numbers and transmitting the first and second encrypted random numbers and the second random number generated by the smart card to the server; and generation of a Session Key by the server and checking of the first and second encrypted random numbers, and the second random number with the aid of the Session Key.

2. Method in accordance with claim 1, wherein the distributed System is an intranet or an Internet.

3. Method in accordance with claim 1, wherein communication between the server and the client runs via SSL (Secure Sockets Layer) as the transfer protocol.

4. Method in accordance with claim 1, wherein on the server a runtime program exists which communicates with the client and uses the keys accessible to the server as necessary, and defines the protocol specifying when which messages must be exchanged with the client and when which keys must be used; and that on the client a runtime program exists which communicates both with the smart card and with the server and which implements the protocol defining when which messages must be exchanged with the smart card and the server.

5. Method in accordance with claim 1, wherein the smart card includes smart card identification data, the smart card identification data including as a minimum a smart card serial number and a smart card type.

6. Method in accordance with claim 1, wherein the digital signature is executed by way of a symmetrical cryptoalgorithm with the aid of the Session Key agreed between the client and the server, or by way of an asymmetrical cryptoalgorithm with the aid of a private key located on the smart card, wherein the server is in possession of the public key.

7. Method in accordance with claim 6, wherein the symmetrical cryptoalgorithm is DES or Triple-DES and the asymmetrical cryptoalgorithm is RSA, DSA or an Elliptic Curve algorithm.

8. Method in accordance with claim 1, wherein the secret key is derived from the smart card identification data and the Master Key.

9. Method in accordance with claim 1, wherein the command sequence as a minimum comprises an Install command, one or more Load commands and a final Install command, and is stored in an Application Protocol Data Unit structure.

10. Method in accordance with claim 1, wherein each command within the command sequence is encrypted by means of the Session Key.

11. Method in accordance with claim 1, wherein the command sequence is a predefined sequence for a specific application which is stored in the nonvolatile memory of the server and is loaded into volatile memory of the server during the program runtime.

12. Method in accordance with claim 1, wherein the command sequence is generated by the server program, and wherein on the server a runtime program exists which communicates with the client and uses the keys accessible to the server as necessary, and defines the protocol specifying when which messages must be exchanged with the client and when which keys must be used; and that on the client a runtime program exists which communicates both with the smart card and with the server and which implements the protocol defining when which messages must be exchanged with the smart card and the server.

13. Method in accordance with claim 12, wherein card-specific data are integrated into the command sequence.

14. Method in accordance with claim 11, wherein the first command within the sequence is assigned a MAC (message authentication code) with the aid of a random number and the secret key and all subsequent commands are assigned a MAC based on the MAC of the preceding command and the key.

15. Device including at least the following components:
a) Client at least including:
  aa) a Browser
  bb) a computer program product to execute sending of a request for a smart card application component, and unpacking of a data packet comprising a signed command sequence and transmission of individual commands thereof in sequence to a processor-based smart card
  cc) a reader for the smart card
b) Server including at least:
  aa) a computer program product to execute:
    i) delivery of a secret code or Session Key by the server to the client responsive to the request
    ii) bundling in the server a sequence of commands to produce a bundled command sequence for downloading of the smart card application component to the smart card
    iii) generation of a digital signature in the server using the secret key or Session Key by way of each command within the command sequence to produce a signed, bundled command sequence comprising a bundled sequence of individually signed commands
    iv) transmission of the signed, bundled command sequence as the data packet to the client, thereby reducing data transfers between the server and the client
  bb) a nonvolatile memory to store the secret keys and the Master Key
c) Communication link between client and server:
wherein the computer program product of the client and the computer program product of the server further execute an authentication method for generation of the Session Key which includes:
  transmission of a request from the server via the client to the smart card to transmit the smart card identification data stored on the smart card;
  reading of the smart card identification data from the nonvolatile memory of the smart card and transmission of the smart card identification data via the client to the server;
  identification from the smart card identification data of an authentication method by means of which a Session Key agreed between the server and the smart card can be generated; and
wherein the computer program product of the client and the computer program product of the server further determine the Session Key by an authentication method comprising:
  generation of a first random number and selection of a secret key by the server;
  transmission of the first random number via the client to the smart card;
  generation of a second random number by the smart card;
  creation of a Session Key from the first and second random numbers;
  encrypting the first and second random numbers and transmitting the first and second encrypted random numbers and the second random number generated by the smart card to the server; and
  generation of a Session Key by the server and checking of the first and second encrypted random numbers, and the second random number with the aid of the Session Key.

16. Client in accordance with claim 15 further including:
a) a smart card reader
b) a smart card with a nonvolatile memory at least containing the following data:
  aa) a card number
  bb) a card type
  cc) a secret key.

17. Computer program product stored in the internal memory of a digital computer, containing elements of software code to execute a method for downloading application components from a server via a client to a processor-based smart card, wherein the server and the client are interconnected via a distributed system, said method comprising:
  sending a request from the client to the server for a smart card application component for the processor-based smart card;
  delivery of a secret key or Session Key by the server to the client, responsive to the request;
  bundling in the server a sequence of commands to produce a bundled command sequence for downloading of the application component to the smart card;

generation of a digital signature in the server using the secret key or Session Key by way of each command within the bundled command sequence to produce a signed, bundled command sequence comprising a bundled sequence of individually signed commands;

transmission of the signed, bundled command sequence as a data packet to the client thereby reducing data transfers between the server and the client;

unpacking of the data packet by the client and transmission of individual signed commands of the bundled command sequence in sequence to the smart card; and checking of the digital signature of the individual commands on the smart card and execution of the commands on the smart card if the digital signature is correct;

wherein the method further includes:

transmission of a request from the server via the client to the smart card to transmit the smart card identification data stored on the smart card;

reading of the smart card identification data from the nonvolatile memory of the smart card and transmission of the smart card identification data via the client to the server;

identification from the smart card identification data of an authentication method by means of which a Session Key agreed between the server and the smart card can be generated;

wherein the Session Key is determined by:

generation of a first random number and selection of a secret key by the server;

transmission of the first random number via the client to the smart card;

generation of a second random number by the smart card;

creation of a Session Key from the first and second random numbers;

encrypting the first and second random numbers and transmitting the first and second encrypted random numbers and the second random number generated by the smart card to the server; and generation of a Session Key by the server and checking of the first and second encrypted random numbers, and the second random number with the aid of the Session Key.

* * * * *